(12) United States Patent
Kim et al.

(10) Patent No.: US 8,733,970 B2
(45) Date of Patent: May 27, 2014

(54) LIGHTING APPARATUS WITH LIGHT CONTROLLING REFLECTIVE LAYER

(75) Inventors: Kyunghyun Kim, Seoul (KR); Siyoung Kim, Seoul (KR); Sangcheon Kim, Seoul (KR); Hankyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 13/233,447

(22) Filed: Sep. 15, 2011

(65) Prior Publication Data

US 2012/0106147 A1 May 3, 2012

(30) Foreign Application Priority Data

Nov. 2, 2010 (KR) .................. 10-2010-0108017

(51) Int. Cl.
*F21V 11/16* (2006.01)

(52) U.S. Cl.
USPC .......... 362/241; 362/97.3; 362/240; 362/247; 362/249.02; 349/62; 349/64

(58) Field of Classification Search
USPC ............. 362/97.1, 97.2, 97.3, 97.4, 236, 237, 362/240, 241, 247, 249.02; 349/62, 64
See application file for complete search history.

(56) References Cited

U.S. PATENT DOCUMENTS

| | | | |
|---|---|---|---|
| 5,390,436 A * | 2/1995 | Ashall | 40/546 |
| 7,052,152 B2 * | 5/2006 | Harbers et al. | 362/30 |
| 7,635,193 B2 * | 12/2009 | Chang | 362/97.3 |
| 7,654,687 B2 * | 2/2010 | Tsai et al. | 362/237 |
| 7,726,828 B2 * | 6/2010 | Sato | 362/97.3 |
| 7,762,705 B2 * | 7/2010 | Sakai et al. | 362/619 |
| 7,771,100 B2 | 8/2010 | Yamamoto et al. | |
| 8,197,103 B2 * | 6/2012 | Chang et al. | 362/311.02 |
| 2006/0187651 A1 | 8/2006 | Kim et al. | |
| 2007/0058359 A1 * | 3/2007 | Saitoh et al. | 362/97 |
| 2011/0261290 A1 * | 10/2011 | Kim et al. | 349/64 |
| 2013/0063927 A1 * | 3/2013 | Lin et al. | 362/97.3 |

FOREIGN PATENT DOCUMENTS

| | | |
|---|---|---|
| EP | 2 261 551 A1 | 12/2010 |
| EP | 2 312 199 A1 | 4/2011 |
| JP | 2009-094087 | 4/2009 |
| KR | 10-2008-0034716 | 4/2008 |
| KR | 10-0959511 | 5/2010 |
| KR | 10-2010-0105424 | 9/2010 |
| WO | WO 2010/016528 A1 | 2/2010 |
| WO | WO 2010/113361 | 10/2010 |

OTHER PUBLICATIONS

European Search Report dated Oct. 12, 2012 for Application 11185012.9.

* cited by examiner

*Primary Examiner* — Ismael Negron
(74) *Attorney, Agent, or Firm* — KED & Associates LLP (57) ABSTRACT

A lighting apparatus may include a case, a circuit board, a light source including a light emitting diode (LED), and a light controlling layer to reflect light from the light source toward an inside of the case to prevent the light from being directly radiated to an outside of the case.

16 Claims, 8 Drawing Sheets

LIGHTING APPARATUS WITH LIGHT CONTROLLING REFLECTIVE LAYER

CROSS-REFERENCE TO RELATED APPLICATION

This application claims priority under 35 U.S.C. §119 from Korean Application No. 10-2010-0108017 filed Nov. 2, 2010, the subject matter of which is hereby incorporated by reference.

BACKGROUND

1. Field

Embodiments may relate to a lighting apparatus. Embodiments may also relate to a lighting apparatus that can prevent or reduce a point light source from directly being observed outside the lighting apparatus, and so as to improve uniformity of lighting.

2. Background

Lighting apparatuses (including incandescent lights, fluorescent lamps and halogen lamps) have been utilized to provide an environment with a lighting effect.

The usage of lighting apparatuses including light emitting diodes (LEDs) as light sources has been increasing, rather than conventional filament lamps, fluorescent lamps or halogen lamps. The light emitting diodes may be directly used as common lightings in houses and/or offices.

According to such a light emitting diode, a p-n junction structure of a semiconductor may be used to create a predetermined quantity of injected carriers (electrons or holes) and a light may be emitted by re-connecting of the carriers. The light emitting diode may be referred to as an LED. The LED may be compact in size in comparison to previous light sources, and may provide a long usage life. The LED may directly convert an electric energy into an optical energy, and may have less power consumption and good efficiency. The LED may be used in a lamp for a variety of electronic devices, including a display device of an automobile instrument and an optical source for optical transmission, a numeral display device and/or a card reader of a calculator.

BRIEF DESCRIPTION OF THE DRAWINGS

Arrangements and/or embodiments may be described in detail with reference to the following drawings in which like reference numerals refer to like elements and wherein.

DETAILED DESCRIPTION

Reference may now be made in detail to specific embodiments, examples of which may be illustrated in the accompanying drawings. Wherever possible, same reference numbers may be used throughout the drawings to refer to the same or like parts.

A lighting apparatus that uses an LED as a light source may include an LED streetlamp, an LED lamp, an LED downlight, an LED flat lighting, an LED tube, an LED sign-channel and/or an LED light-bar, namely, an LED luminaire and/or an LED lighting apparatus, for example.

Types of the LEDs, arrangement of the LEDs and a number of the LED may be differentiated based on the environment where the LED may be used. Light generated from the LED may be uniformly supplied to a lighting object area to use for room lighting.

For example, in an LED flat lighting, a plurality of LEDs may be arranged on a flat panel to light a region that is located approximately in front of the flat panel. The LED may be considered a point light source. An intensity of each light reaching specific points of the lighting object area may be differentiated. When the lighting apparatus is observed through human eyes, a strong light generated from the LED may be directly observed and a glare may occur.

A lighting apparatus may use a diffusing plate, such as a diffuser on the flat panel on which the LEDs are arranged, in order to reduce the glare.

A diffuser may diffuse light incident thereon after being radiated from the LED, which is a point source of light, and a loss of light transmittance may result from the diffusing process. If diffusivity is heightened to attach an importance to the uniformity of the lighting, the light transmittance may be lowered. In other words, the LED flat panel lighting may increase the diffusivity of the diffuser and the LED flat panel lighting may fail to achieve a satisfactory uniform lighting.

As the diffuser is installed further away from the LED, uniformity of lighting may increase. However, a space between the diffuser and the LED may disadvantageously increase a volume (or size) of the lighting apparatus.

A lighting apparatus may be applicable to all types of lighting apparatuses that use light sources for lighting. The lighting apparatus may be applicable to streetlamps, lamps, downlights, flat lighting devices, tube type lighting devices, signboard/interior and exterior lighting apparatuses, light bars and/or all types of lighting apparatuses.

A flat type lighting apparatus may be embodied to help explain embodiments.

Figure 1:
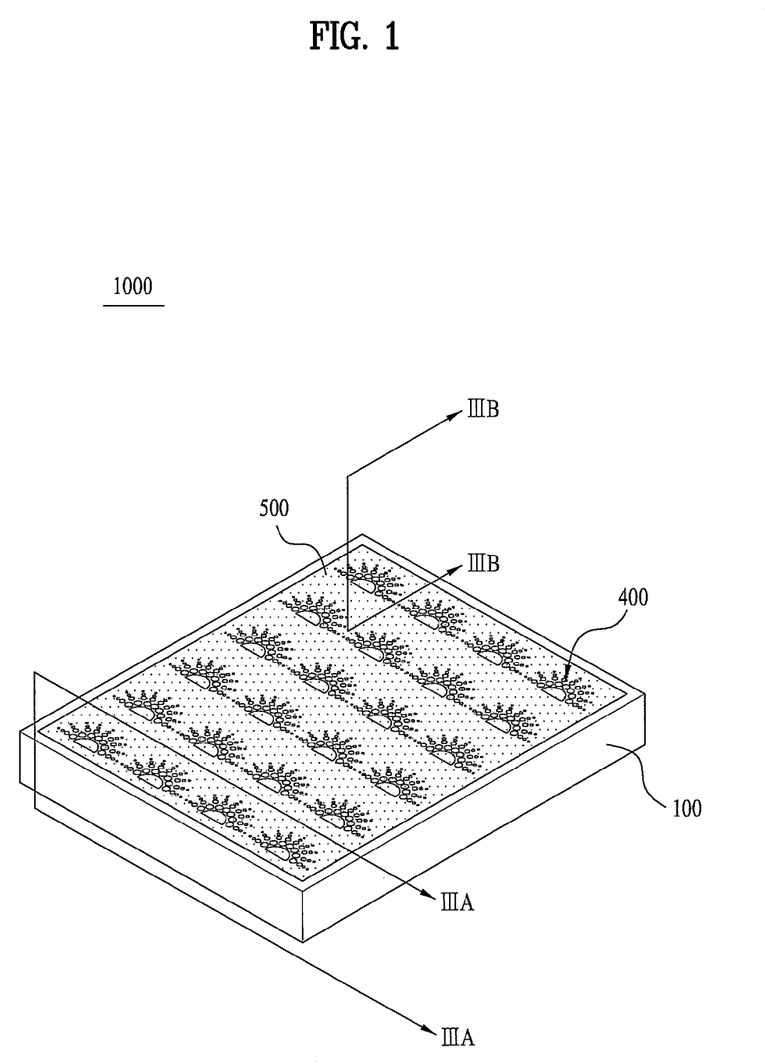
FIG. 1 is a perspective view of a lighting apparatus according to an embodiment.

FIG. 1 is a perspective view of a lighting apparatus according to an embodiment. Other embodiments and configurations may also be provided.

FIG. 1 shows a lighting apparatus 1000 that includes a case 100 for defining an exterior appearance thereof and a diffusing member 500 (or diffuser) provided on a top of the case 100.

A plurality of light sources 300 may be provided in the case 100, and the light sources 300 may emit light toward the top of the case 100 (i.e., the diffusing member 500). The lights irradiated from the light sources 300 may scatter and disperse via the diffusing member 500, so as to be diffused toward an outside of the lighting apparatus 1000.

A light controlling layer 400 (or light controlling member) may be provided underneath the diffusing member 500 to uniformly provide the lights provided by the light sources 300 in a predetermined pattern. Structures of the light controlling layer 400 and the lighting apparatus 1000 may be described with respect to FIG. 2.

Figure 2:
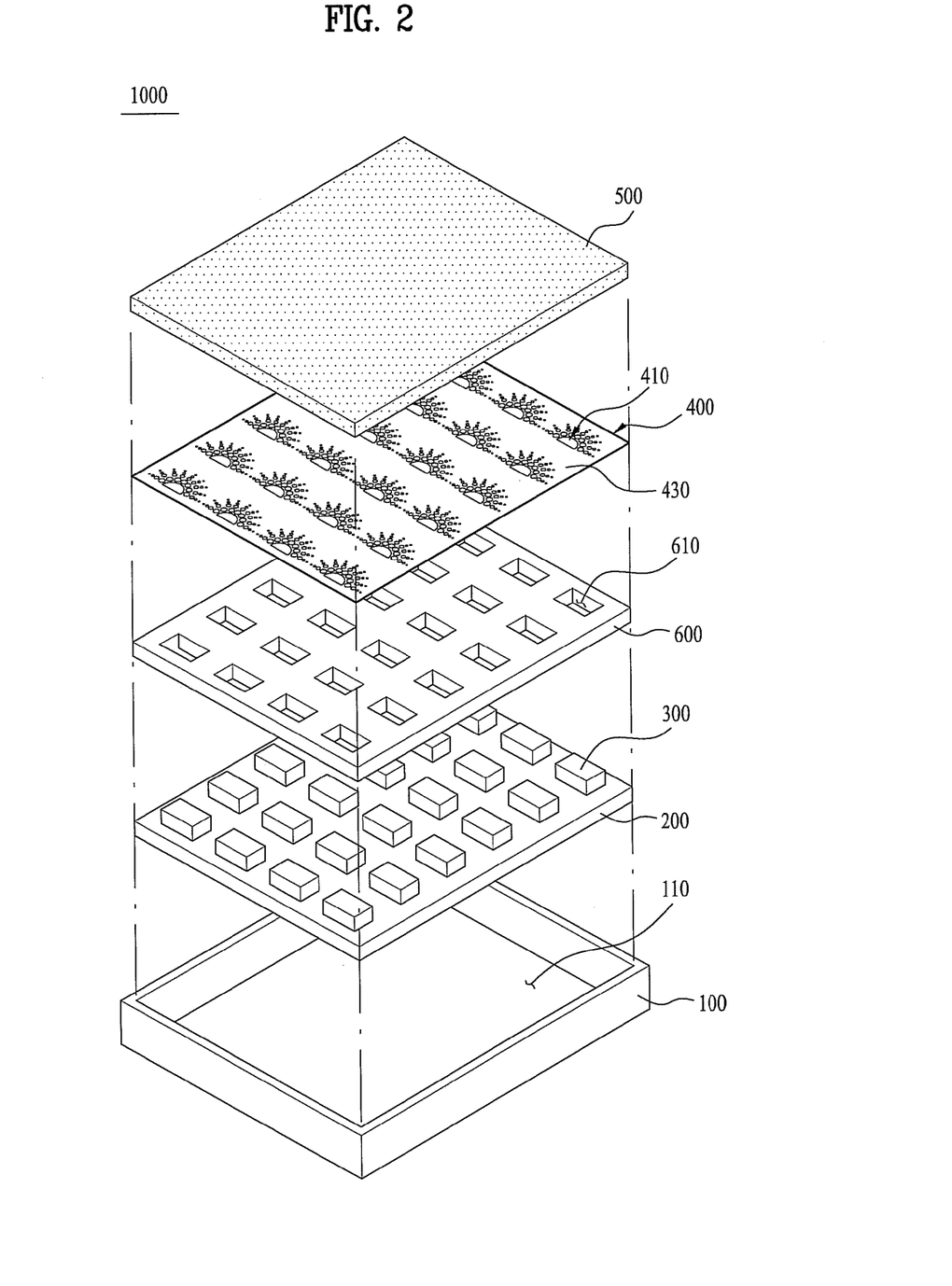
FIG. 2 is an exploded perspective view of the lighting apparatus according to the embodiment.

FIG. 2 is an exploded perspective view of the lighting apparatus according to the exemplary embodiment.

As shown in FIG. 2, the lighting apparatus may include the case 100 having an open top, a circuit board 200 provided in the case 100, the plurality of light sources 300 to light an environment via the open top of the case 100, and the light controlling layer 400 provided in the case 100 to reflect some of the lights irradiated from the light sources 300 toward an inside of the case 100 and to prevent some of the light from being directly irradiated to an outside of the case 100. FIG. 2 also shows a light guide member 600 (or a light guide layer) and a diffusing member 500 (or diffusing layer).

The case 100 may define the exterior appearance of the lighting apparatus 1000. The case 100 may receive the circuit board 200 on which the light sources 300 are mounted.

The case 100 may be rectangular parallelepiped, with closed surfaces other than the open top. The case 100 may receive the circuit board 200 and the light sources 300 therein. The case 100 may include an accommodating part 110, which is a predetermined room formed therein, to accommodate the circuit board 200 and the light sources 300.

The case 100 may have a cubical shape, with an open top and other closed surfaces. The light generated from the light sources 300 may be provided outside via the open top of the case 100. The case 100 may be formed based on all kinds of materials. The case 100 may be formed of a material with a high light reflectance that allows the light not directly supplied to the top of the case 100, and allows the light to be reflected from inside of the case 100 to be irradiated via the top of the case 100. The case 100 may be formed of a material (e.g. a metal material) with a high heat conductivity to emit heat generated by operation of the light sources 300 to an outside of the lighting apparatus 1000.

A connector may be provided in the case 100 to transmit an electric power supplied from an external power supply to the light sources 300. Alternatively, an internal power supply, which may be charged independently from the external power supply, may be provided in the case 100 to supply an electric power to the light sources 300.

The circuit board 200 may have a flat plate shape to be provided in the case 100 with the plurality of the light sources 300 provided thereon. The circuit board 200 may be electrically connected with the light sources 300, and the circuit board 200 may transmit power supplied from the power supply to the light sources 300.

A controller may be provided on the circuit board 200 to control dimming of the light sources 300 and/or to operate the light sources 300 with a variety of lighting effects, such as sequentially on and off.

The light sources 300 may generate light to light an external environment of the lighting apparatus 100. The light sources 300 may include a plurality of light emitting diodes (LEDs). The light sources 300 including the LEDs may be provided on the circuit board 200.

A lighting method using the LEDs may be classified as a direct type lighting that can directly irradiate lights to an open top of the case 100 or as an edge type lighting that can guide lights incident from the LED on an edge to provide the guided lights toward the open top of the case 100.

The lighting apparatus 1000 may include the light guide member 600 to guide the lights incident on an edge thereof from the light sources 300. The lighting apparatus 1000 may adapt the edge type in which lights generated from the light sources 300 are incident on an edge of the light guide member 600 to be guided in the light guide member 600 and then to be irradiated upward from the light guide member 600.

The light guide member 600 may be formed of a polycarbonate material or a polyurethane material light guide member 600

As shown in FIG. 2, the light guide member 600 may include a plurality of through holes 610 formed in correspondence to the plurality of the light sources 300 mounted on the circuit board 200. The light sources 300 mounted on the circuit board 200 may pass through the through holes 610 to allow the lights to be incident on the edge of the light guide member 600.

The lighting apparatus 1000 may include the diffusing member 500 provided on a top of the case 100 to scatter and disperse the lights irradiated from the light sources 300.

The diffusing member 500 may be formed in a flat plate shape and may be mounted to the open top of the case 100 in an airtight manner, without any gap.

As shown in FIG. 2, the diffusing member 500 may be provided beyond the light sources 300 and the light guide member 600, to scatter and disperse lights projected upward from the light guide member 600. Because of the diffusing member 500, the lights irradiated from the LEDs, which are point light sources, may be diffused and a uniform lighting may then be achieved.

Figure 3:
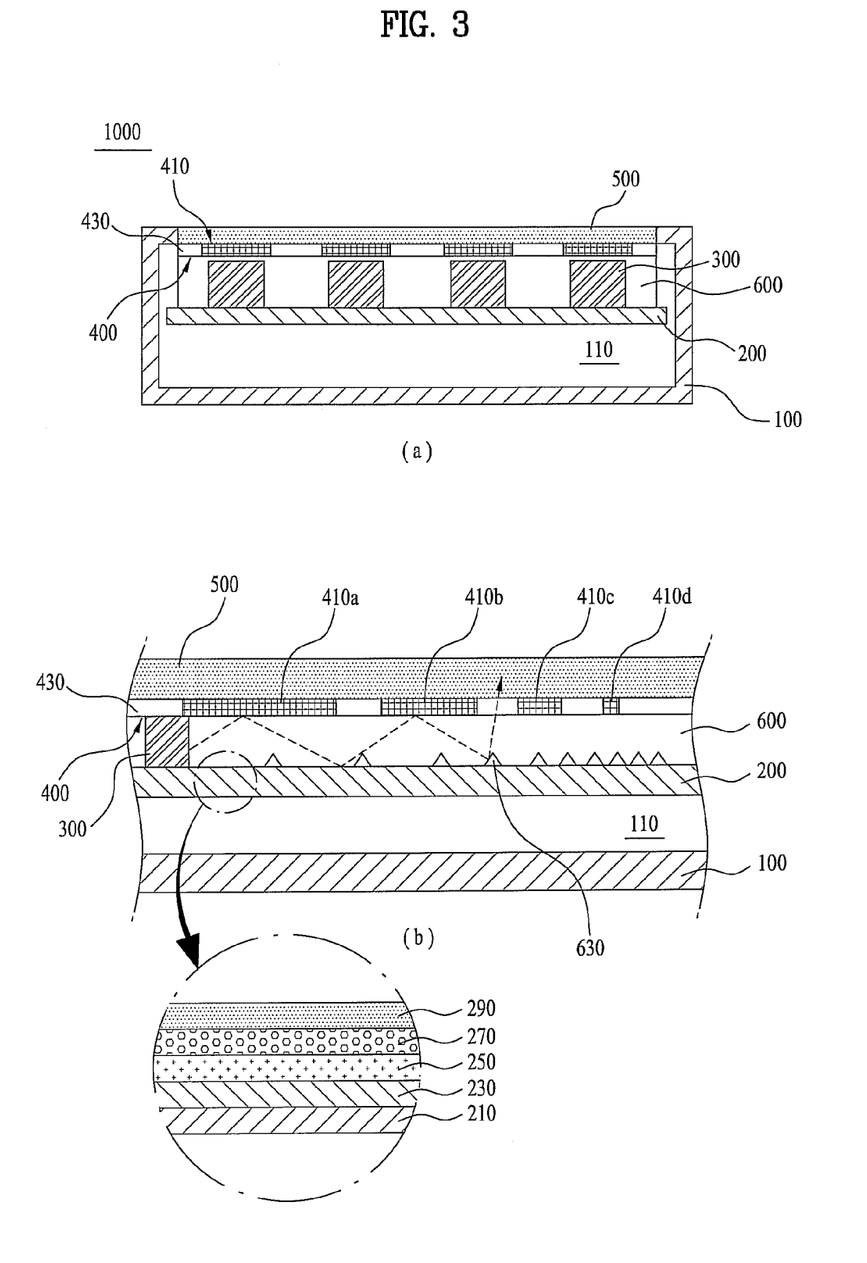
FIGS. 3(a) and 3(b) are sectional views of the lighting apparatus (shown in FIG. 1) cut away along IIIA-IIIA and IIIB-IIIB lines.

The lighting apparatus 1000 may include the light controlling layer 400 provided between the circuit board 200 and the diffusing member 500. The light controlling layer 400 may include a plurality of first reflection patterns 410 to reflect some of the lights irradiated from the light sources 300. The light controlling layer 400 may be described with reference to FIG. 3.

FIGS. 3(a) and (b) sectional views illustrating a cross section cut away along IIIA-IIIA and IIIB-IIIB lines. FIG. 3(a) is a sectional view of the lighting apparatus 1000 (shown in FIG. 1) cut away along the IIIA-IIIA line. FIG. 3(b) a sectional view of the lighting apparatus 1000 (shown in FIG. 1) cut away along the IIIB-IIIB line.

As shown in FIG. 3(b), the accommodating part 110 may be provided in the case 100 to accommodate the circuit board 200, the light sources 300 and the light guide member 600. The open top of the case 100 may be closed by the diffusing member 500.

The plurality of light sources 300 may be provided on the circuit board 200, and the light guide member 600 may be provided on the circuit board 200. The plurality of light sources 300 may insertedly pass through the plurality of through holes 610.

The diffusing member 500 may be provided beyond the light sources 300 and the light guide member 600. The light controlling layer 400 may be provided between the diffusing member 500 and the light sources 300.

The light controlling layer 400 may include a plurality of first reflection patterns 410. Each of the reflection patterns 410 may include a plurality of first reflection parts 410a, 410b, 410c and 410d (and 410e) configured to reflect some of the light irradiated from the corresponding light source 300. The light controlling layer 400 may be described with reference to FIG. 3(b) and FIG. 4.

Figure 4:
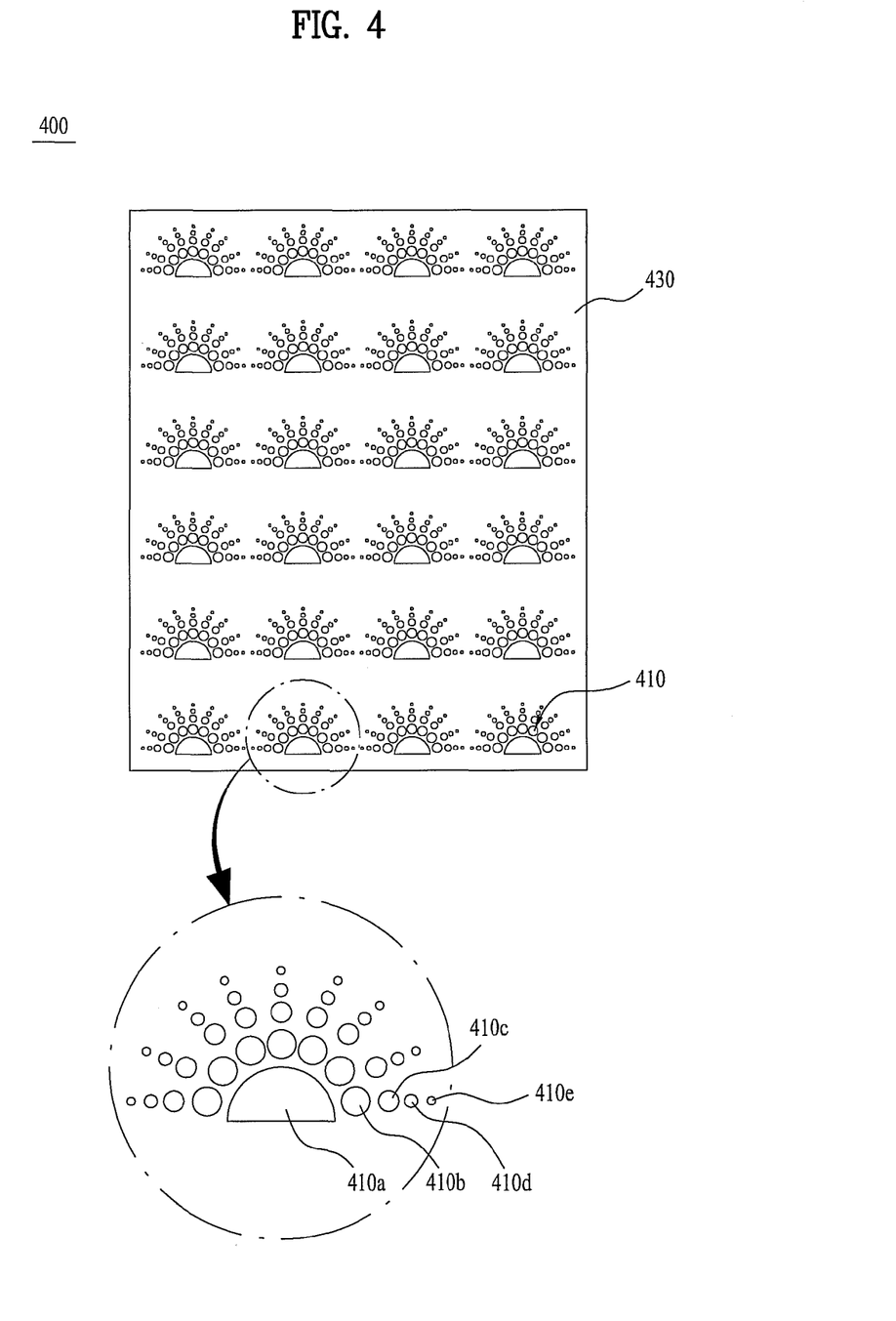
FIG. 4 is a view of a light controlling layer according to an embodiment.

FIG. 4 is a plane view of a light controlling layer according to an embodiment.

The light controlling layer 400 may reflect some of the lights generated from the light sources 300 to the inside of the case 100 and to prevent (or reduce) some of the lights from being directly irradiated to the outside of the case 100. As shown by a dotted line of FIG. 3(b), some of light irradiated from the light source 300 may be incident on an edge of the light guide member 600 and may be guided along the inside of the light guide member 600. The guided light may be reflected toward the inside of the case 100 by the first reflection part 410a that is closest to the corresponding light source 300, and the guided light may be re-reflected by the second reflection part 410b and may be provided outside via a predetermined space between the second reflection part 410b and the third reflection part 410c.

The light controlling layer 400 (including the plurality of first reflection patterns may prevent (or reduce) a glare phenomenon that might be generated by the LEDs. The light generated by the LED, which is a point light source, may have a high brightness. If the lights irradiated from the light sources 300 are directly observed by an observer, the glare may be generated. The lights irradiated from the light sources 300 may be reflected to the inside of the case 100 from the reflection pattern 410, and the reflected lights may be reflected a predetermined number of times inside the case 100. The lights with a lowered brightness after a predetermined quantity of an energy is consumed may be projected toward the outside the case 100. As such, the glare phenomenon may be effectively prevented (or reduced).

As shown in FIG. 4, the reflection pattern 410 (of the light controlling layer 400) may have a plurality of first reflection parts. Because of that, a lighting object area may be lighted in a predetermined pattern. The reflection pattern 410 may be formed like a pattern of water drops that spread outward from a center. The predetermined pattern is not limited to the pattern shown in FIG. 4. The predetermined pattern may include a variety of patterns that can be determined based on an environment or personal taste.

As shown in FIG. 4, the reflection pattern 410 may include a plurality of first reflection parts 410a-410e where a size of each reflection part (of the reflection pattern 410) may decrease based on a distance from the corresponding LED. For example, a size of the first reflection part 410 is larger than the second reflection part 410b, which in turn is larger than the third reflection part 410c. Additionally, the third reflection part 410c is larger than the fourth reflection part 410d, which in turn is larger than the fifth reflection part 410e. Accordingly, a uniform lighting may be achieved.

As the size of the reflection parts gets larger, a quantity of the light reflected toward the inside of the case 100 by the reflection pattern 410 may be larger. Accordingly, it may be difficult to directly project the light near some of the light sources 300, with a high brightness, via the top of the case 100. As the size of the reflection parts gets lower, the quantity of the lights reflected to the inside of the case 100 by the reflection pattern 410 gets smaller. Accordingly, it may be easier to project some of the lights having a relatively low brightness which are distant from the light sources 300 via the top of the case 100.

FIGS. 3(a) and 3(b) show that the size of the reflection parts forming the reflection pattern 410 decreases as it gets farther from the corresponding light source 300. In other words, a size of the first reflection pattern 410a closest to the light source 300 is largest and sizes of the reflection parts 410b, 410c, 410d and 410e get smaller as the parts get farther from the corresponding light source 300.

It may be difficult to directly project the lights having a high brightness near the light sources 300 via the top of the case 100. In contrast, it may be easy to project the lights having a relatively low brightness that are distant from the light sources 300 via the top of the case 100. This may be because an area where the lights reflect is decreasing and because an area where the lights are transmitted is increasing at a same time, as it gets farther from the light sources 300. As a result, the lighting apparatus 1000 may achieve a more uniform lighting.

The first reflection pattern 410 may reflect the light generated from the light source 300 toward the inside of the case 100. Lights may also be transmitted via a space formed between two of the reflection patterns 410. The light controlling layer 400 may also include a light transmittable film 430.

Each of the first reflection patterns 410 may be ink printed on the light transmittable film 430. The reflection part 410a closest to a corresponding light source 300 may be formed of a dark color ink to reflect and absorb the light having a high brightness near the light source 300.

The light controlling layer 400 may be provided on a top surface or a bottom surface of the diffusing member 500. The light controlling layer 400 may be attached to the bottom surface of the diffusing member 500. The lights generated from the light sources 300 may be incident on the diffusing member 500, and the lights may be scattered and dispersed along various directions. If the light controlling layer 400 is provided on the diffusing member 500, it may be difficult to expect the direction of the lights and to control the lights as desired.

FIG. 3(b) shows the light guide member 600 provided between the circuit board 300 and the light controlling layer 400.

The lights irradiated from the light sources 300 may be incident on an edge of the light guide member 600 to be guided along an inside of the light guide member 600. The light guide member 600 may guide the direction of the lights. The light guide member 600 may be formed of a polycarbonate resin.

As shown in FIG. 3(b), the lights irradiated from the light sources 300 may be full-reflected from the inside of the light guide member 600. Different from the direct type lighting apparatus in which the light sources 300 directly irradiate lights toward the top of the case 100, the edge type lighting apparatus may adapt the light guide member 600 and it may have an effect of a reduced number of light sources 300. A projection angle of the light irradiated upward may be limited in the direct type. To completely light the lighting object area, a large number of light sources may be required and a distance between each two neighboring light sources should not be relatively far. However, when the light guide member 600 is used, the light guide member 600 may guide the lights incident on the edge thereof, to guide the lights along a longitudinal direction of the light guide member 600. Accordingly, the required number of the light sources 300 may be remarkably reduced.

Only if the lights generated from the light sources 300 are guided in the light guide member 600, the lights may not be provided outside the lighting apparatus 1000 and it may be required to reflect the lights inside the light guide member 600 to the outside.

Figure 5:
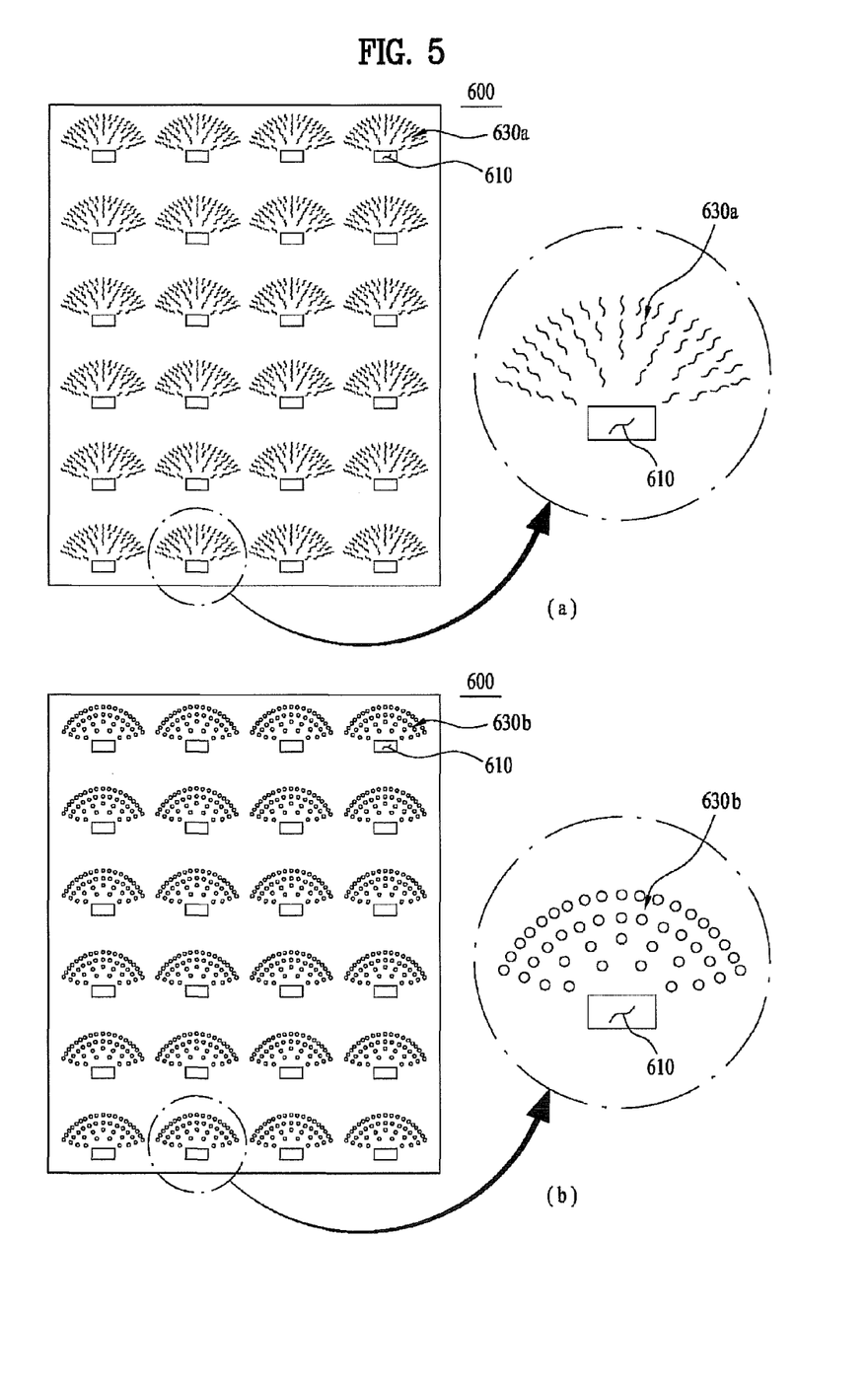
FIG. 5 is a view of a light guide member according to an embodiment.

As shown in FIGS. 5 and 3(b), the light guide member 600 may also include a plurality of second reflection patterns 630 with each second reflection pattern including a plurality of second reflection parts. Each second reflection pattern 630 may correspond to one of the light sources 300 (or LEDs). A density of the second reflection parts for each second reflection pattern 630 may increase based on a distance from the corresponding light source (or LED). The reflection parts may be scratches 630a or dots 630b. Each reflection pattern 630 may be provided on a bottom surface of the light guide member 600 to reflect the lights guided therein and to supply them to the diffusing member 500. FIG. 5 is a bottom view of the light guiding member 600.

Each second reflection pattern 630 may upwardly reflect the light guided in the light guide member 600.

As shown in FIG. 3(b), the light proceeding in the light guide member 600 may be reflected by the reflection pattern 630 to be supplied to an upper portion of the light guide member 600 (i.e., the top of the case 100). When the lights reflected by the reflection pattern 630 are proceeding to a region of the light controlling layer 400 where a first reflection pattern 430 is formed, the lights may be reflected downward again. When the lights are proceeding to a region of the light controlling layer 400 where the reflection pattern 430 is not formed, the lights may proceed toward the diffusing member 500.

As shown in FIGS. 3(b) and 5, the number of scratches 630a or dots 630b for a unit area may be in proportion to a distance from the light sources. As the distance gets farther away from the corresponding light source 300, a strength of the light may decrease. In other words, the number of scratches 630a or dots 630b for each unit area may increase as the scratches or dots are located farther from the light sources 300, to reflect light farther from the light sources 300 upward to the top of the case 100 more than the lights having a high brightness near the light sources 300. This may make the lighting apparatus 1000 achieve a uniform lighting.

FIG. 5(a) shows the plurality of scratches 630a formed in a bottom surface of the light guide member 600 as example of the second reflection pattern 630. FIG. 5(b) shows the plurality of dots 630b formed in the bottom surface of the light guide member 600. Both FIGS. 5(a) and 5(b) show that an intensity (or density) of scratches 630a or dots 630b increases as it is located farther from the through holes 610 where the light sources 300 are inserted.

The structure of the circuit board 200 may be described with reference to FIG. 3(b).

As shown in FIG. 3(b), the circuit board 200 may include a conductive layer 250 configured of a circuit pattern to be electrically connected with the light sources 300, a base substrate 210 formed below the conductive layer 250 to transmit heat generated from the light sources 300 to an outside of the lighting apparatus and an insulation layer 230 provided between the conductive layer 250 and the base substrate 210 to prevent an electrical connection between the conductive layer 250 and the base substrate 210.

A circuit pattern may be formed on the conductive layer 250 to electrically connect with the light sources 300 and to apply a driving signal to the light sources 300. The conductive layer 250 may be employed as a conductivity line of the circuit, and the conductive layer 250 may be formed of a copper (Cu) layer to improve electric conductivity.

The circuit pattern may be printed on the circuit board 200, and the circuit pattern may be referred to as a printed circuit board (PCB).

The base substrate 210 may be employed as a heat radiation plate to absorb heat generated from the light sources 300 to create a heat radiation effect. The base substrate 210 may include a metal material, especially aluminum (Al) having high heat conductivity that is used to absorb the heat generated from the light sources 300.

The circuit board 200 may be formed of a metal material such as aluminum and copper and may be referred to as a metal PCB. However, the base substrate is not limited to the metal material, and the base substrate may be formed of a variety of materials having a high heat conductivity. For example, the base substrate may be formed of a heat conductive plastic material having a predetermined heat transfer coefficient that is 5~100 times as much as a heat transfer coefficient of plastic.

The insulation layer 230 may be provided between the conductive layer 250 and the base substrate 210 to prevent an electrical connection between the conductive layer 250 (including the circuit pattern) and the base substrate 210, which is the heat radiation layer. The insulation layer 230 may be formed of an insulation material. The insulation layer 230 may be formed of a layer that is as thin as possible in a range that can achieve insulation to enhance the heat radiation effect.

As shown in FIG. 3(b), the circuit board 200 may include a reflective layer 290 layered on the conductive layer 250 to upwardly reflect the lights radiated from the light sources 300 and/or the lights reflected by the light controlling layer 400.

The reflective layer 290 may be formed of a gold (Au) or silver (Ag) layer, and the reflective layer 290 may reflect the lights projected downward from the light sources 300 or reflected by the light controlling layer 400 upwardly to efficiently transmit them. In other words, a metal having a high light reflectance may radiate the lights toward the open top of the case 100 so as to enable lights with a high brightness to be emitted. The reflective layer 290 may be formed of another metal with a high light reflectance, rather than the gold or silver layer.

As shown in FIG. 3(b), the circuit board 200 may further include a nickel (Ni) layer 270 on a top surface of the conductive layer 250. The nickel layer 270 may be employed as a barrier layer that can stop carriers (electrons or holes) of electric currents between a metal and a semiconductor to prevent the carriers from easily flowing to either of the metal and the semiconductor.

According to the lighting apparatus 1000, some of the lights radiated from the light sources 300 may be prevented from being directly radiated to the outside of the case 100 and the glare phenomenon caused by the point light sources may be prevented or reduced.

Further, the lights directly radiated from the light sources 300 may be reflected and may be transmitted to outside of the lighting apparatus. Accordingly, uniformity of the lighting may be improved.

Figure 6:
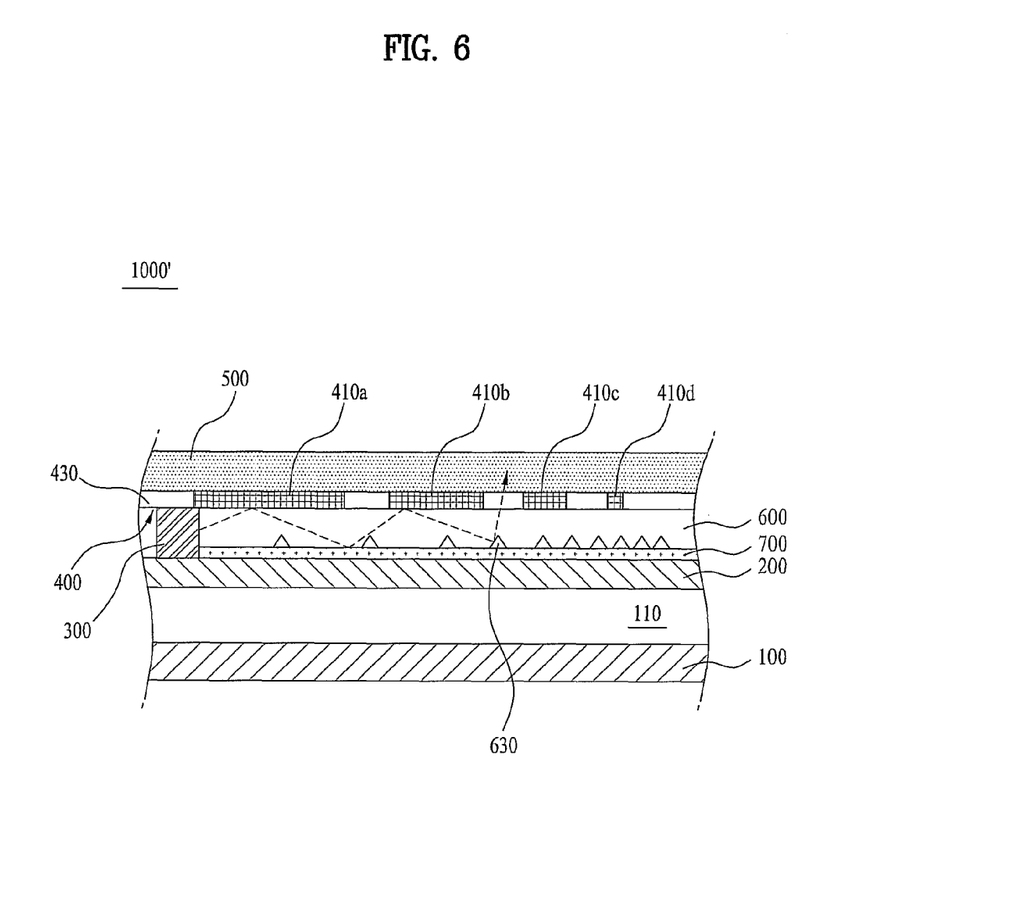
FIG. 6 is a partial side sectional view of a lighting apparatus according to an embodiment.

FIG. 6 is a side sectional view of a partial section of a lighting apparatus according to an embodiment. Other embodiments and configurations may also be provided.

As shown in FIG. 6, the lighting apparatus 1000' may include a reflector 700 provided between the light guide member 600 and the circuit board 200. The components other than the reflector 700 may be identical to components shown in FIG. 3(b), and a detailed description may be omitted.

The lighting apparatus 1000' may include the reflector 700 provided under the light guide member 600, independent from the reflection pattern provided to upwardly guide the lights proceeding in the light guide member 600. Accordingly, some of the lights proceeding in the light guide member 600 by full-reflection after radiated from the light sources 300 may be prevented (or reduced) from getting out via a bottom of the light guide member 600 completely and the lights getting out via the bottom of the light guide member 600 may be incident on the inside of the light guide member 600 again.

The lighting apparatus 1000' may include the reflector 700, and the lighting apparatus 1000' may prevent the lights from escaping via a bottom of the light guide member 600, to light the lighting object area with a more enhanced brightness.

Figure 7:
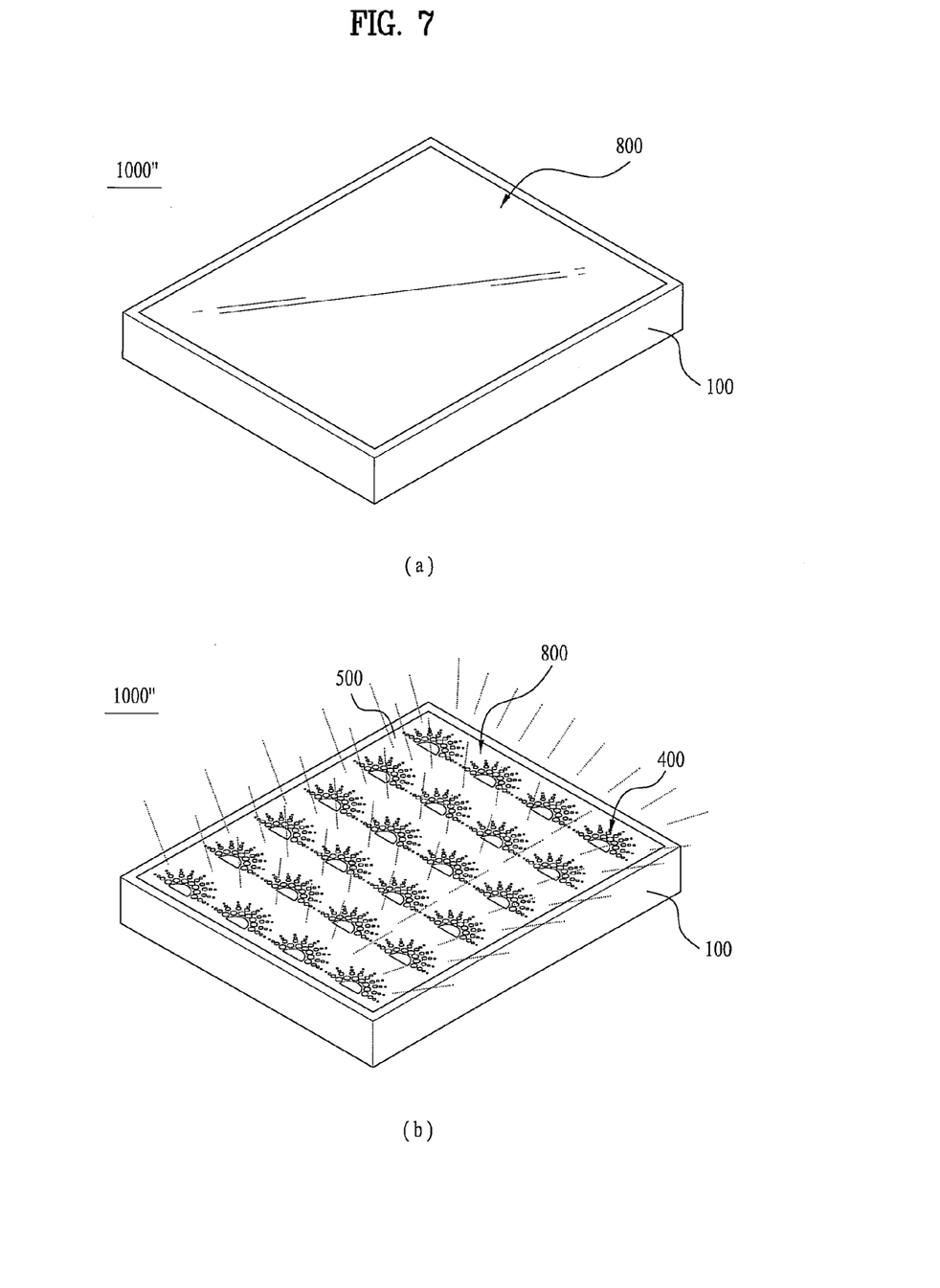
FIGS. 7(a) and 7(b) are perspective views of an operational state of the lighting apparatus according to the embodiment.

FIG. 7 is a perspective view of an operational state of a lighting apparatus according to a further embodiment. FIG. 7(a) is a perspective view illustrating that light sources provided in the lighting apparatus 1000" are off. FIG. 7(b) is a perspective view illustrating that the light sources provided in the lighting apparatus 1000" are on.

The lighting apparatus 1000" may include a deposition member 800 deposited on a top surface of the diffusing member 500. Components other than the deposition member 800 may be identical to those of the embodiments described with respect to FIGS. 1 to 6, and a detailed description may be omitted.

To form the deposition member 800, a metal deposition process may be performed on a light transmittable film or plate. Accordingly, it may be differentiated whether the object is observable based on brightness of an object located below the deposition member 800.

The deposition member 800 may be formed of an auxiliary material independent from the diffusing member 500, or the deposition member 800 may be directly coated on the top surface of the diffusing member 500.

Accordingly, as shown in FIG. 7(a), the diffusing member or the light controlling layer, especially the reflection part formed on the light controlling layer along the predetermined pattern, may not be clearly observed while the LEDs forming the light sources are off, because it is located below the light sources. As shown in FIG. 7(b), the predetermined pattern formed on the light controlling layer 400 may be observed while the LEDs are on, in spite of the deposition member 800.

In other words, the lighting apparatus 1000" may have a mirror effect while the light sources are off and the lighting apparatus 1000" may provide a wonderful feeling created by the fancy pattern that can be observed while the light sources are on.

Figure 8:
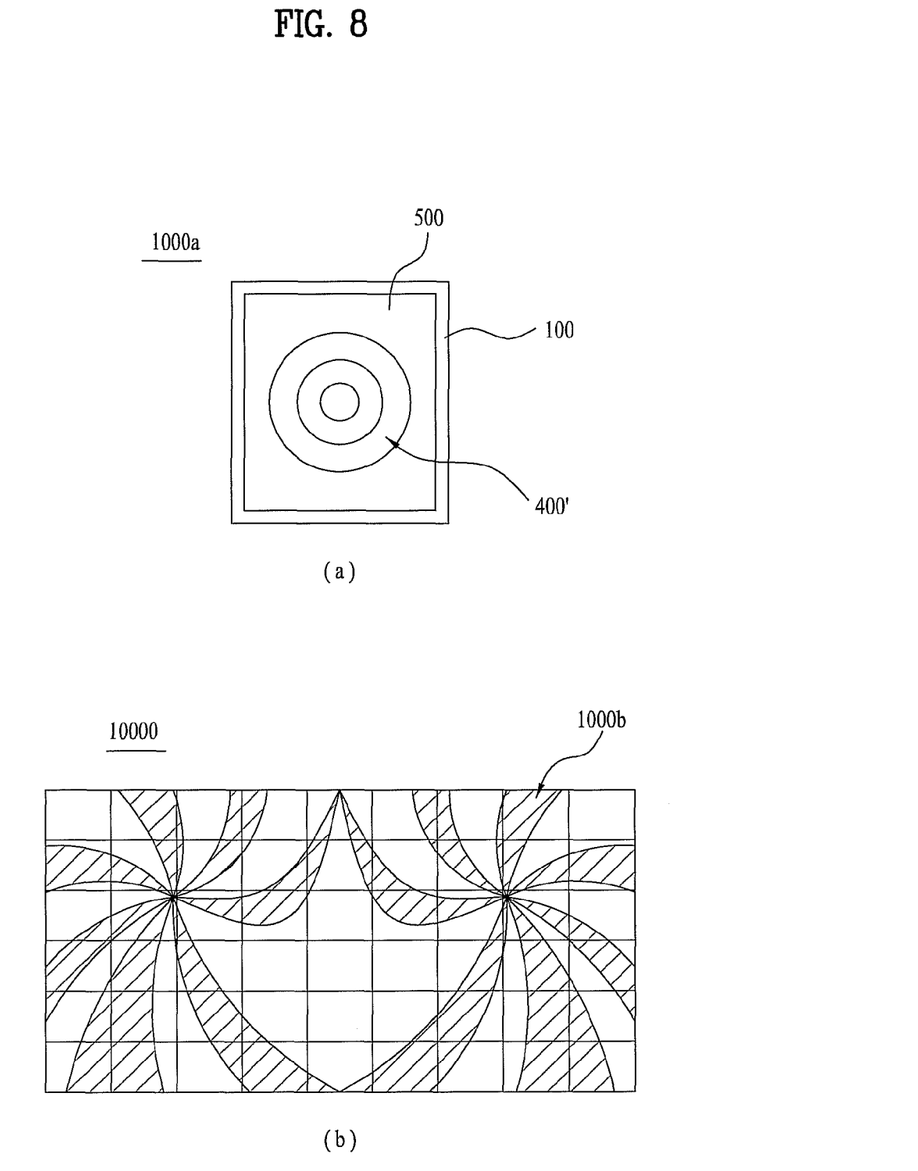
FIGS. 8(a) and 8(b) are diagrams to illustrate examples of the lighting apparatus.

FIG. 8 is a diagram to explain examples of applications of the lighting apparatus.

As shown in FIG. 8(a), a reflection part provided in a light controlling layer 400' of a lighting apparatus 1000a may be formed with a predetermined pattern having a plurality of concentric circles with different sizes, respectively, which is different from the pattern of the reflection part 410 according to FIG. 4. The pattern of the reflection part provided in the light controlling layer forming the lighting apparatus may be variable based on a consumer's taste or characteristics of the environment.

According to FIG. 8(b), a plurality of lighting apparatuses 1000b may be arranged along a predetermined pattern to form a lighting system 10000. Combination of patterns formed in the reflection parts of the light controlling layers provided in the light apparatuses 1000b may form a predetermined design.

The lighting apparatus may provide lighting having various patterns by using the light controlling layer. Accordingly, consumers may have an aesthetic appreciation of the lighting.

Embodiments may be directed to a lighting apparatus. Embodiments may provide a lighting apparatus that can prevent glare caused by a light source and that can enhance a uniformity of lighting.

Embodiments may provide a lighting apparatus that can provide lighting having a predetermined pattern to enhance an aesthetic appreciation of lighting.

Embodiments may provide a lighting apparatus that includes a case having an open top, a circuit board provided in the case, a light source electrically connected with the circuit board to light an environment via the open top of the case, and a light controlling layer provided on the top of the case to reflect a predetermined quantity of lights radiated from the light source toward an inside of the case and to prevent the predetermined quantity of the lights from being directly radiated to an outside of the case.

The light controlling layer may include a reflection part configured to reflect the predetermined quantity of the lights radiated from the light source. The reflection part may be formed along a predetermined pattern.

The reflection part may include a region in which an intensity of the predetermined pattern decreases gradually as a distance from the light source increases.

The reflection part may include a region in which a size of the predetermined pattern gradually decreases as a distance from the light source increases.

The light controlling layer may further include a light transmittable film. The reflection part may be ink printed in the light transmittable film.

The lighting apparatus may further include a diffusing member provided on the top of the case, to scatter and disperse lights radiated from the light source.

The light controlling layer may be attached to a bottom surface of the diffusing member.

The lighting apparatus may further include a deposition member deposited on a top surface of the diffusing member.

The case may be formed in a rectangular parallelepiped shape and surfaces other than a top surface may be closed, to accommodate the circuit board and the light source.

The circuit board may include a conductive layer configured of a circuit pattern to be electrically connected with the light source, a base substrate provided below the conductive layer, to transmit heat generated from the light source outside, and an insulation layer provided between the conductive layer and the base substrate to prevent an electrical connection between the conductive layer and the base substrate.

The circuit board may further include a reflection layer layered on a top surface of the conductive layer, to reflect lights radiated from the light source and/or lights reflected by the light controlling layer upwardly.

The base substrate may include a metal material.

The light source may include a light emitting diode (LED).

A lighting apparatus may include a light source configured to generate a light to light an environment, a diffusing member provided beyond the light source to scatter and disperse the light radiated from the light source, and a light controlling layer provided between the light source and the diffusing member. The light controlling layer may include a reflection part formed along a predetermined pattern to reflect a predetermined quantity of lights radiated from the light source.

The lighting apparatus may further include a light guiding member to guide a proceeding of lights incident on an edge thereof from the light source.

A plurality of scratches or a plurality of dots may be formed in a bottom surface of the light guiding member to reflect the lights proceeding within the light guiding member toward the diffusing member.

The number of scratches or dots for each unit area may be proportional to a distance from the light source.

The lighting apparatus may further include a reflector provided between a circuit board (on which the light source is mounted) and the light guiding member.

The lighting apparatus may prevent the predetermined quantity of the lights radiated from the light source from being directly radiated outside. Accordingly, a glare phenomenon, which may be caused by a point light source, can be prevented.

The lighting apparatus may reflect the lights directly radiated from the light source and provide the lights outside. Accordingly, uniformity of lighting may be enhanced.

The lighting apparatus may provide lighting with various patterns by using the light controlling layer. Accordingly, an aesthetic appreciation may be provided by the lighting.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
   a case;
   a circuit board in the case;
   a light source to electrically connect with the circuit board, the light source to light an environment via the case, the light source including a plurality of light emitting diodes (LED);
   a light guide member provided on the light source, the light guide member to guide the lights incident on an edge thereof from the light sources; and
   a light controlling layer provided over the light guide member in the case, the light controlling layer to reflect light from the light source toward an inside of the case and reduce light from being directly radiated to an outside of the case,
   wherein the light controlling layer includes a plurality of first reflection patterns each associated with a separate light emitting diode (LED),
   wherein each first reflection pattern includes a plurality of first reflection parts, and a size of each first reflection part for a corresponding first reflection pattern decreases with increasing a distance from the corresponding LED,
   wherein the light guide member includes a plurality of through holes formed in correspondence to the plurality of the LEDs, and
   wherein the plurality of LEDs mounted on the circuit board pass through the through holes to allow the lights to be incident on the edge of the light guide member.

2. The lighting apparatus of claim 1, further comprising:
   a reflector between the circuit board and the light guide member.

3. The lighting apparatus of claim 1, wherein density of each first reflection part decreases with increasing a distance from the corresponding LED.

4. The lighting apparatus of claim 1, wherein the light controlling layer further includes a light transmittable film, wherein the plurality of first reflection parts are printed on the light transmittable film.

5. The lighting apparatus of claim 1, wherein the case is formed in a rectangular parallelepiped shape and surfaces of the case are closed other than a top surface, the case to receive the circuit board and the light source.

6. The lighting apparatus of claim 1, wherein the light guide member includes a plurality of second reflection patterns each associated with a separate LED, wherein each reflection pattern includes a plurality of second reflection parts, and a density of the second reflection parts for the corresponding second reflection pattern increases with increasing a distance from the corresponding LED.

7. The lighting apparatus of claim 6, wherein the second reflection parts are scratches or dots.

8. The lighting apparatus of claim 1, further comprising:
   a diffusing member provided over the light controlling layer to scatter and disperse light from the light source.

9. The lighting apparatus of claim 8, further comprising:
   a metal layer deposited on a surface of the diffusing member.

10. A lighting apparatus comprising:
    a case;
    a circuit board in the case;
    a light source to electrically connect with the circuit board, the light source to light an environment via the case, the light source including a plurality of light emitting diodes (LED);
    a light guide member provided on the light source, the light guide member to guide the lights incident on an edge thereof from the light sources;
    a light controlling layer between the light guide member and the diffusing member, the light controlling layer to reflect the light from the light source toward an inside of the case and to reduce light from being directly radiated to an outside of the case; and
    a diffusing member provided over the light controlling layer to scatter and disperse light from the light source,
    wherein the light controlling layer includes a plurality of first reflection patterns each associated with a separate LED, the light guide member including a plurality of second reflection patterns each associated with a separate LED, wherein each second reflection pattern includes a plurality of second reflection parts, wherein a density of the second reflection parts for the corresponding second reflection pattern increases with increasing a distance from the corresponding LED,
    wherein the light guide member includes a plurality of through holes formed in correspondence to the plurality of LEDs, and
    wherein the plurality of LEDs are mounted on the circuit board pass through the through holes to allow the lights to be incident on the edge of the light guide member.

11. The lighting apparatus of claim 10, wherein a size of each first reflection part for the corresponding first reflection pattern of the light controlling layer decreases with increasing a distance from the corresponding LED.

12. The lighting apparatus of claim 10, wherein the second reflection parts of the light guide member are scratches or dots.

13. The lighting apparatus of claim 10, further comprising:
    a reflector between the circuit board and the light guide member.

14. The lighting apparatus of claim 10, wherein the light controlling layer further includes a light transmittable film, wherein the first reflection parts of the light controlling layer are printed on the light transmittable film.

15. The lighting apparatus of claim 10, further comprising:
    a metal layer deposited on a surface of the diffusing member.

16. The lighting apparatus of claim 10, wherein the case is formed in a rectangular parallelepiped shape and surfaces of the case are closed other than a top surface, the case to receive the circuit board and the light source.

* * * * *